United States Patent
Tokuhara

(10) Patent No.: US 12,208,656 B2
(45) Date of Patent: Jan. 28, 2025

(54) CONTROL SYSTEM AND STRADDLE-TYPE VEHICLE

(71) Applicant: Hitachi Astemo, Ltd., Hitachinaka (JP)

(72) Inventor: Masato Tokuhara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 229 days.

(21) Appl. No.: 18/054,785

(22) Filed: Nov. 11, 2022

(65) Prior Publication Data

US 2023/0364960 A1   Nov. 16, 2023

Related U.S. Application Data

(63) Continuation of application No. PCT/JP2020/025000, filed on Jun. 25, 2020.

(51) Int. Cl.
*B60G 17/017* (2006.01)
*B60G 17/019* (2006.01)
*B60R 25/33* (2013.01)

(52) U.S. Cl.
CPC ......... *B60G 17/017* (2013.01); *B60G 17/019* (2013.01); *B60R 25/33* (2013.01); *B60G 2300/12* (2013.01); *B60G 2400/71* (2013.01); *B60G 2500/11* (2013.01); *B60R 2325/306* (2013.01)

(58) Field of Classification Search
CPC ............ B60G 17/017; B60G 17/019; B60G 2300/12; B60G 2400/71; B60G 2500/11; B60R 25/33; B60R 2325/306
See application file for complete search history.

(56) References Cited

U.S. PATENT DOCUMENTS

2019/0001776 A1   1/2019   Murakami et al.

FOREIGN PATENT DOCUMENTS

| JP | 2014080072 A | * | 5/2014 | ............ B60K 11/06 |
| JP | 2016113091 A |   | 6/2016 | |
| JP | 2016160968 A |   | 9/2016 | |
| JP | 2018144650 A |   | 9/2018 | |

OTHER PUBLICATIONS

International Search Report mailed Aug. 11, 2020 for the corresponding PCT International Patent Application No. PCT/JP2020/025000 (5 pages including English translation).

* cited by examiner

*Primary Examiner* — Jacob M Amick
(74) *Attorney, Agent, or Firm* — Leason Ellis LLP; Edward J. Ellis; Melvin C. Garner

(57) ABSTRACT

This control system comprises: a control device which, while a vehicle is driven, receives power to control the operation of a moving part and which, while the vehicle is stopped, does not receive power; and a system which is capable of communicating with the control device, and which, when the vehicle is stopped, receives power so as to be capable of ascertaining first information pertaining to time or which is capable of acquiring, during the driving, second information pertaining to times before and after when the vehicle was stopped. When the vehicle is restarted after being stopped, the control device uses at least one of the first information and the second information received from the system to ascertain the time elapsed while the vehicle was stopped, and uses the elapsed time to control the operation of the moving part.

19 Claims, 10 Drawing Sheets

CONTROL SYSTEM AND STRADDLE-TYPE VEHICLE

CROSS REFERENCE TO RELATED APPLICATIONS

This application is a Continuation of International Patent Application No. PCT/JP2020/025000 filed on Jun. 25, 2020, the content of which is incorporated herein by reference in its entirety.

FIELD OF THE INVENTION

The present invention relates to a control system and a straddle-type vehicle.

BACKGROUND OF THE INVENTION

In recent years, a device that adjusts a height (vehicle height) of a vehicle main body of a vehicle has been proposed.

For example, a front fork, a rear suspension, and a control device described in Patent Literature 1 are an example of a device that adjusts a vehicle height of a motorcycle. In addition, a device described in Patent Literature 2 includes a vehicle height adjustment suspension that includes a support member that supports an end portion of a suspension spring and a jack chamber and that changes a vehicle height of a vehicle body by moving the support member by supplying liquid to the jack chamber. The device described in Patent Literature 2 includes a hydraulic pump that has a pump-side oil chamber connected to the jack chamber via an oil passage and variable in a volume by a movement of a pump-side piston and that supplies a liquid from the pump-side oil chamber to the jack chamber, a motor that drives the pump-side piston, and a control device that controls driving of the motor.

Patent Literature 1: JP 2018-144650 A
Patent Literature 2: JP 2016-160968 A

SUMMARY OF THE INVENTION

For example, when appropriately controlling a control target such as preventing occurrence of a situation in which a control target such as a suspension provided in a vehicle is damaged, or controlling the control target to a desired state, it may be desirable to consider a temperature. For example, when the control target includes a motor as a drive device, it is necessary to prevent a temperature of the motor from becoming too high from a viewpoint of preventing the motor from being damaged by heat. During driving, the control device can estimate the temperature using time information grasped using a timer function of the control device. However, in the control device in which the timer function of the control device itself is also paused during a pause of the vehicle, it is not possible to acquire the time information during a pause. For this reason, it is not possible to estimate the temperature immediately after start-up with high accuracy when restart is performed after the pause. As a result, the temperature after the restart cannot be estimated with high accuracy, and the control target may not be optimally controlled.

An object of the present invention is to provide a control system and the like capable of appropriately controlling a control target after restart even when the control system itself does not have a function of acquiring time information during a pause.

The present inventors have studied a control in a case where a first system including a first control device that does not have a function of obtaining time information by itself or a function of operating a timer and a second control device that has a function of obtaining time information by itself, which communicate with each other, is stopped and then restarted. In the case of developing a second system (a second system used in the first system) including the first control device and a movable unit whose operation is controlled by the first control device, since the first control device does not have a function of obtaining the time information by itself, information on a time during which a device in which the second system is mounted is paused has not been directly used for control by the first control device. Instead, for example, measures have been taken such as determining the content of control by the first control device on an assumption of a state in which the time during which the device is paused is a minimum value or a maximum value. According to the control of such contents, it is easy to secure the safety and reliability of the second system, but on the other hand, the time during which the function of the first control device is exhibited after the restart is likely to be limited. The present inventors have intensively studied a technique capable of increasing the time for causing the first control device to exhibit the function after the restart while maintaining the safety and reliability of the second system. As a result, it has been found that, when another control device (second control device) that communicates with the first control device has a function of obtaining the time information by itself, the first control device can obtain information on the time from the second control device even if the first control device itself does not have the function of obtaining the time information by itself or the function of operating the timer. By determining the content of the control by the first control device using the information on the time acquired in this way, the first control device can realize the function thereof for a longer time after the restart while maintaining the safety and reliability. As a result, these functions are likely to be exhibited to the maximum while maintaining the safety and reliability of the second system including the first control device and the first system including the second system, and therefore it is considered that it becomes easier to appropriately control a control target after the restart. The present invention has been completed based on such findings. Hereinafter, the present invention will be described.

One aspect of the present invention is a control system including: a control device that is energized during driving of a vehicle to control an operation of a movable unit, and de-energized during a pause of the vehicle; and a system that is communicable with the control device, and is configured to grasp first information on time by being energized during the pause or to acquire second information on time points before and after the pause of the vehicle during the driving. The control device is configured to, when the vehicle is restarted after the pause, grasp an elapsed time, which is a time elapsed during the pause, using at least one of the first information and the second information received from the system, and control the operation of the movable unit using the elapsed time.

Here, the movable unit may be a motor that is driven by being energized, and the control device may be configured to estimate, during the driving, a temperature of the motor using an amount of current supplied to the motor and a time during which the current is supplied, estimate, when the vehicle is restarted after the pause, the temperature of the motor using the elapsed time, and control the motor in consideration of the estimated temperature.

Further, the control device may be configured to, control the operation of the movable unit using an output value of a sensor, and when the vehicle is restarted after the pause, the control device may be configured to control the operation of the movable unit using a difference between a current output value of the sensor and a reference output value in a case where the elapsed time is equal to or longer than a predetermined time and control the operation of the movable unit using a difference between the current output value of the sensor and an output value before the pause in a case where the elapsed time is less than the predetermined time.

The movable unit may be an electromagnetic valve configured to change an area of a flow path of oil, and the control device may be configured to, when the vehicle is restarted after the pause, control an operation of the electromagnetic valve such that the area of the flow path in a case where the elapsed time is equal to or longer than a predetermined time is larger than that in a case where the elapsed time is less than the predetermined time.

The system may be an anti-theft system that is energized during a pause to authenticate a key of the vehicle and prevent theft of the vehicle.

The system may be a GPS configured to acquire information on a time point transmitted from a GPS satellite.

In addition, the control device may be configured to control the operation of the movable unit provided in a suspension disposed between the vehicle and a vehicle wheel.

Another aspect of the present invention is a straddle-type vehicle including a vehicle main body, a vehicle wheel, and the control system according to the above-described aspect.

According to the present invention, it is possible to appropriately control the control target after the restart even when the control system does not have the function of acquiring the time information during a pause.

DETAILED DESCRIPTION OF THE INVENTION

Hereinafter, embodiments of the present invention will be described in detail with reference to the accompanying drawings. The following embodiments are exemplary embodiments of the present invention, and the present invention is not limited to the following embodiments.

First Embodiment

Figure 1:
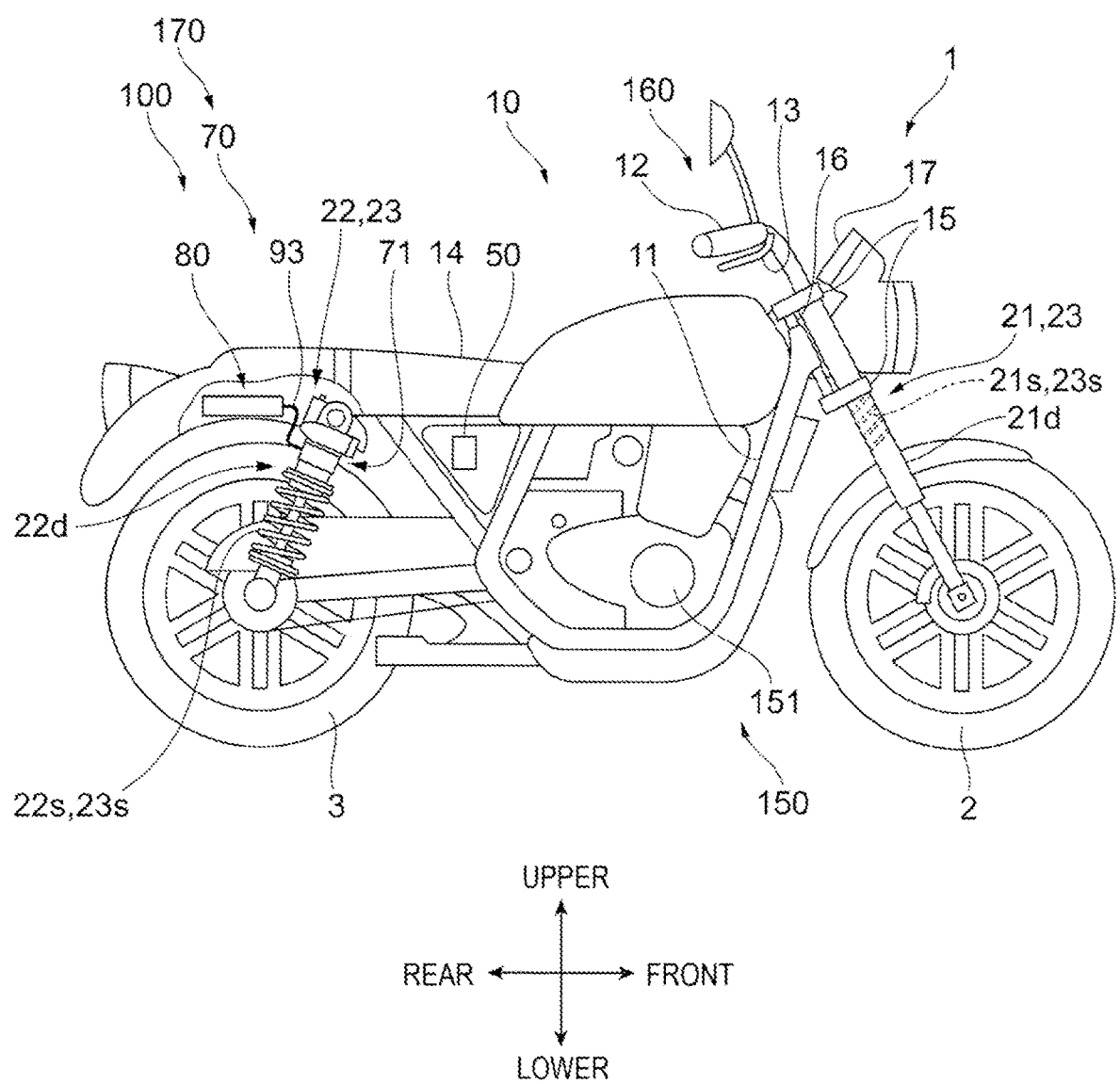
FIG. 1 is a diagram illustrating an example of a schematic configuration of a motorcycle 1 according to a first embodiment.

FIG. 1 is a diagram illustrating an example of a schematic configuration of a motorcycle 1 according to a first embodiment.

Figure 2:
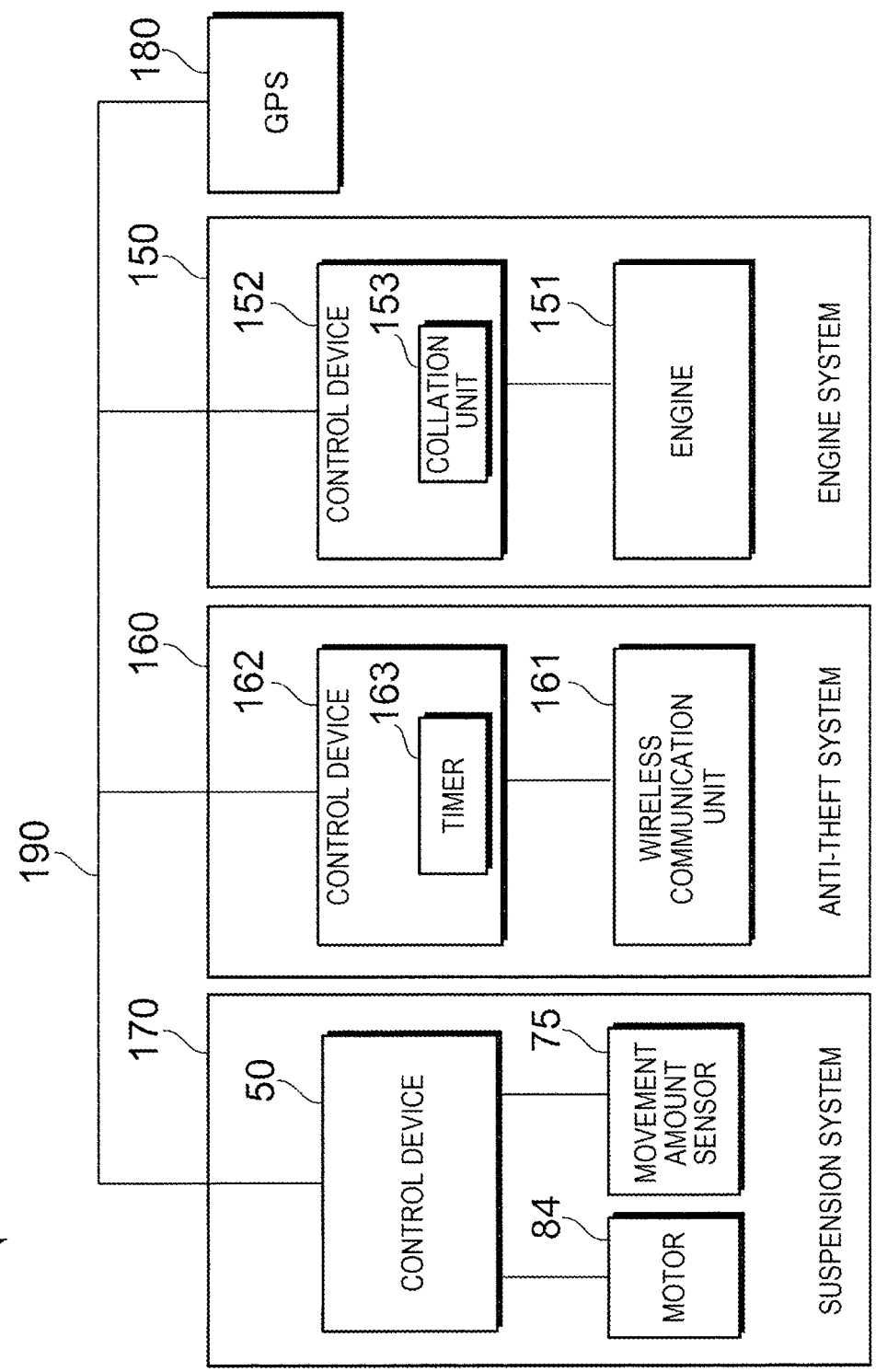
FIG. 2 is a diagram illustrating an example of a schematic configuration of a system constituting the motorcycle 1.

FIG. 2 is a diagram illustrating an example of a schematic configuration of a control system 120.

Reference is made to FIGS. 1 and 2. The motorcycle 1 as an example of a straddle-type vehicle includes a front wheel 2 as a vehicle wheel on a front side, a rear wheel 3 as a vehicle wheel on a rear side, and a vehicle main body 10. The vehicle main body 10 includes a vehicle body frame 11 that forms a framework of the motorcycle 1, a handle 12, a brake lever 13, a seat 14, and a user interface 17 that is operatable by a user.

In addition, the motorcycle 1 includes a control system 120 including an engine system 150, an anti-theft system 160 that prevents theft of the motorcycle 1, a suspension system 170, and a GPS 180 that detects a current position of the motorcycle 1 by a known global positioning system.

The engine system 150 includes an engine 151 and a control device 152 that controls driving of the engine 151.

The anti-theft system 160 includes a wireless communication unit 161 that acquires an ID code of a key (not illustrated) of the motorcycle 1 from the key, and a control device 162 that authenticates the key using the ID code acquired from the wireless communication unit 161.

Each of the control device 152 and the control device 162 includes a CPU, a ROM in which a program executed by the CPU, various data, and the like are stored, a RAM used as a working memory or the like of the CPU, and an EEPROM which is a nonvolatile memory. In addition, the control device 162 includes a timer 163 that calculates an elapsed time by counting clocks.

The control device 152 and the control device 162 mutually transmit data via a vehicle network (for example, a controller area network (CAN)) 190.

The control device 162 transmits the ID code acquired from the wireless communication unit 161 to the control device 152.

The control device 152 includes a collation unit 153 that collates the ID code received from the control device 162 with its own ID code. Further, when the collation unit 153 determines that both the codes match, the control device 152 starts energization of a starter motor (not illustrated) by turning on, for example, an ignition switch (not illustrated), and starts the engine 151.

When the engine 151 is started, the motorcycle 1 is started. On the other hand, when the ignition switch is turned off, the driving of the engine 151 is stopped. Hereinafter, a time when the engine 151 is driven may be referred to as "during driving" of the motorcycle 1, and a time when the engine 151 is stopped may be referred to as "during a pause" of the motorcycle 1.

The engine system 150, the anti-theft system 160, the suspension system 170, and the GPS 180 are energized by a battery (not illustrated) during the driving. The anti-theft system 160 and the collation unit 153 of the control device 152 are energized from the battery to operate even during the pause. During the pause, the suspension system 170 and the GPS 180 do not operate since the suspension system 170 and the GPS 180 are not energized from the battery.

(Suspension System 170)

The suspension system 170 has one suspension 21 on a front wheel 2 side that connects the front wheel 2 and the vehicle main body 10, on each of the left side and the right side of the front wheel 2. In addition, the suspension system 170 includes two brackets 15 that hold the two suspensions 21, and a shaft 16 disposed between the two brackets 15. The suspension 21 includes a spring 21s that absorbs an impact applied to the front wheel 2 from a road surface or the like, and a damping device 21d that damps a vibration of the spring 21s.

The suspension system 170 includes one suspension 22 on a rear wheel 3 side that connects the rear wheel 3 and the vehicle main body 10, on each of the left side and the right side of the rear wheel 3. The suspension 22 includes a spring 22s that absorbs an impact applied to the rear wheel 3 from a road surface or the like, and a damping device 22d that damps a vibration of the spring 22s.

In the following description, the front wheel 2 and the rear wheel 3 may be collectively referred to as a "vehicle wheel", and the vehicle main body 10 may be referred to as a "vehicle body". In addition, the suspension 21 on the front wheel 2 side and the suspension 22 on the rear wheel 3 side may be collectively referred to as a "suspension 23". The spring 21s and the spring 22s may be collectively referred to as a "spring 23s". In addition, the damping device 21d and the damping device 22d may be collectively referred to as a "damping device 200".

The suspension system 170 includes an adjustment unit 70 that adjusts a height of the vehicle main body 10, in other words, a vehicle height, by changing an initial load (preload) applied to the spring 23s.

In addition, the suspension system 170 includes a control device 50 that controls the initial load of the spring 23s and a damping force of the damping device 200.

Figure 3:
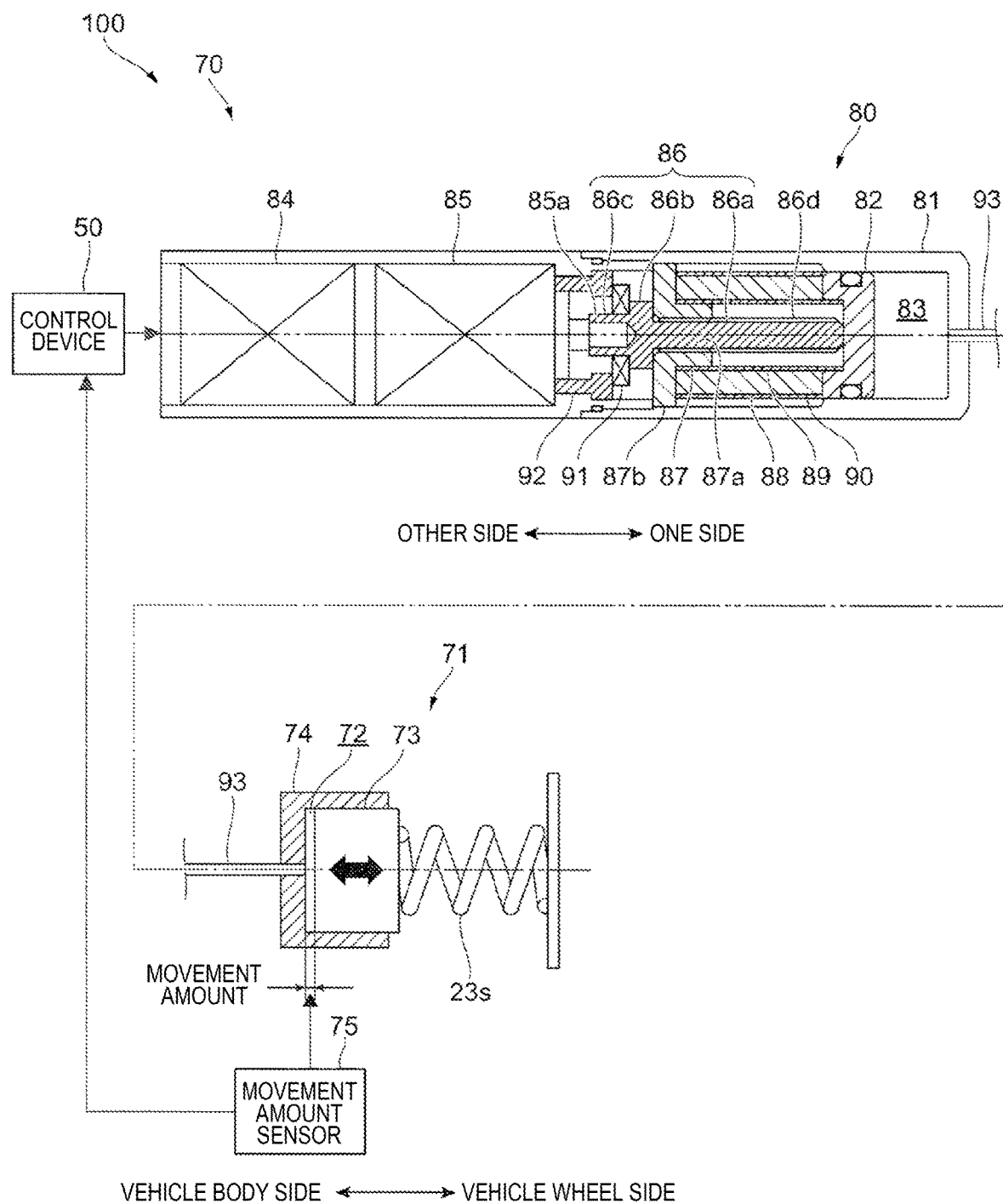
FIG. 3 is a diagram illustrating an example of a schematic configuration of a vehicle height adjustment device 100.

FIG. 3 is a diagram illustrating an example of a schematic configuration of a vehicle height adjustment device 100.

The vehicle height adjustment device 100 that adjusts the vehicle height of the motorcycle 1 includes the adjustment unit 70, the control device 50, and the like.

(Adjustment Unit 70)

Reference is made to FIGS. 1 and 3. The adjustment unit 70 is provided in the suspension 23, and includes a jack unit 71 that adjusts a length of the spring 23s, and a supply device 80 that supplies oil to a jack chamber 72 of the jack unit 71.

The jack unit 71 includes a support member 73 that supports an end portion of the spring 23s on a vehicle main body 10 side, and a forming member 74 that forms the jack chamber 72 together with the support member 73, and adjusts the length of the spring 23s by a movement of the support member 73 according to an amount of oil in the jack chamber 72. The support member 73, the jack chamber 72, and the forming member 74 can be implemented by a support member, a jack chamber, and a hydraulic jack of a rear suspension or a front fork described in Patent Literature 1, respectively.

The jack unit 71 includes a movement amount sensor 75 that detects a movement amount of the support member 73. The movement amount of the support member 73 detected by the movement amount sensor 75 is a movement amount in a case where a movement amount when the support member 73 is positioned at a reference position is set to 0. The reference position is, for example, a position of the support member 73 when the oil in the jack chamber 72 is 0. The movement amount sensor 75 is, for example, a sensor that winds a coil (not illustrated) around an outer peripheral surface of the forming member 74, uses the support member 73 as a magnetic body, and detects the movement amount of the support member 73 using an inductance of a coil that changes in accordance with the movement of the support member 73 with respect to the forming member 74. The movement amount sensor 75 includes an oscillation circuit (not illustrated) that detects information on the inductance of the coil and oscillates at a cycle (frequency) corresponding to a change in the inductance, and a timer (not illustrated) that measures a value corresponding to a frequency of an oscillation waveform by the oscillation circuit and outputs the measured value. Hereinafter, the value output from the timer may be referred to as an "output value of the movement amount sensor 75" or an "output value". The oscillation circuit and the timer may be provided integrally with the control device 50, or may be provided in a member separate from the control device 50.

As illustrated in FIG. 3, the supply device 80 includes a housing 81 that stores oil, and a cylindrical piston 82 that slides in the housing 81. A storage chamber 83 for storing oil is formed in a space surrounded by an inner surface of the housing 81 and the piston 82.

In addition, the supply device 80 includes a motor 84, a speed reducer 85 that reduces a rotational speed of the motor 84, and a screw 86 connected to an output shaft 85a of the speed reducer 85.

The motor 84 may be, for example, a direct current (DC) motor with a brush. The driving of the motor 84 is controlled by the control device 50. The speed reducer 85 may be, for example, a planetary speed reducer using a known planetary gear mechanism.

The screw 86 includes a first portion 86a, a second portion 86b, and a third portion 86c, which are three columnar portions having different diameters, in this order from one side (a right side in FIG. 3) to the other side (a left side in FIG. 3) in a rotation axis direction. An outer diameter of the second portion 86b is larger than an outer diameter of the first portion 86a and an outer diameter of the third portion 86c. A male screw 86d is formed on an outer peripheral surface of the first portion 86a. An output shaft 85a of the speed reducer 85 is fitted inside the third portion 86c. As a result, the screw 86 rotates integrally with the output shaft 85a of the speed reducer 85.

The supply device 80 includes a nut 87 in which a female screw 87a meshing with the male screw 86d formed in the first portion 86a of the screw 86 is formed. The nut 87 includes a flange 87b at an end portion on the other side.

In addition, the supply device 80 includes an intervening member 88 interposed between the flange 87b of the nut 87 and the piston 82, a cylindrical collar 89 disposed inside the intervening member 88 and outside the nut 87, and a cylindrical collar 90 disposed outside the intervening member 88. The intervening member 88 is an elastic member, and is sandwiched between the piston 82 and the flange 87b of the nut 87 in a state in which the intervening member 88 is elastically deformed by being pressurized by the piston 82 that receives a force from the oil. Accordingly, the intervening member 88 suppresses a rotation of the nut 87 in accordance with a rotation of the screw 86.

The supply device 80 includes a bearing 91 that rotatably supports the screw 86, and a support member 92 that supports the bearing 91. The bearing 91 is disposed between the support member 92 and the second portion 86b of the screw 86.

The piston 82, the motor 84, the speed reducer 85, the screw 86, the nut 87, the intervening member 88, the collar 89, the collar 90, the bearing 91, and the support member 92 described above are accommodated in the housing 81.

Further, the supply device 80 includes a hose 93 that is attached to the housing 81, provided between the storage chamber 83 and the jack chamber 72 of the jack unit 71 and allows oil to flow between the storage chamber 83 and the jack chamber 72.

In the adjustment unit 70 configured as described above, when a shaft of the motor 84 of the supply device 80 rotates, the screw 86 rotates in the same direction as the shaft of the motor 84, and the nut 87 moves to the one side in the rotation axis direction. With a movement of the nut 87, the collar 89, the collar 90, and the intervening member 88 receive a force from the other side toward the one side in the rotation axis direction, and move the piston 82 toward the one side in the rotation axis direction. Accordingly, the oil is discharged from the storage chamber 83, and the oil is supplied into the jack chamber 72 via the hose 93. As a result, the support member 73 moves to a vehicle wheel side (the right side in FIG. 3) with respect to the forming member 74, in other words, the movement amount of the support member 73 from the reference position increases, and a spring length of the spring 23s decreases.

When the spring length of the spring 23s decreases, the force with which the spring 23s presses the support member 73 becomes larger than that before the support member 73 moves with respect to the forming member 74. As a result, even if a force acts from the vehicle body toward the vehicle wheel side, an initial load that does not change a relative position between the vehicle body and the vehicle wheel side increases. In this case, when the same force acts on the vehicle wheel side from the vehicle body side, a sinking amount of the suspension 23 (a change in a distance between the vehicle body and the vehicle wheel) decreases. Therefore, when the spring length of the spring 23s is shortened due to the movement of the support member 73 with respect to the forming member 74, the height of the vehicle main body 10 increases (the vehicle height increases) as compared with the height before the movement of the support member 73 with respect to the forming member 74.

On the other hand, when the shaft of the motor 84 of the supply device 80 rotates in a direction opposite to the above, the screw 86 also rotates in the direction opposite to the above. Then, a force from the piston 82 that receives the force of the oil in the storage chamber 83 acts on the flange 87b of the nut 87 via the collar 89, the collar 90, and the intervening member 88, and the nut 87 moves to the other side in the rotation axis direction. As the nut 87 moves to the other side, a volume of the storage chamber 83 increases. Accordingly, the support member 73 discharges the oil in the jack chamber 72 and supplies the oil to the storage chamber 83. As a result, the support member 73 moves toward the vehicle body side (left side in FIG. 3) with respect to the forming member 74, in other words, the movement amount of the support member 73 from the reference position decreases, and the spring length of the spring 23s increases.

When the spring length of the spring 23s is increased, the force with which the spring 23s presses the support member 73 becomes smaller than that before the support member 73 moves with respect to the forming member 74. As a result, when the same force acts on the vehicle wheel side from the vehicle body side, the sinking amount of the suspension 23 increases. Therefore, when the spring length of the spring 23s increases due to the movement of the support member 73 with respect to the forming member 74, the height of the vehicle main body 10 decreases (the vehicle height decreases) as compared with the height before the movement of the support member 73 with respect to the forming member 74.

(Control Device 50)

Next, the control device 50 will be described.

Figure 4:
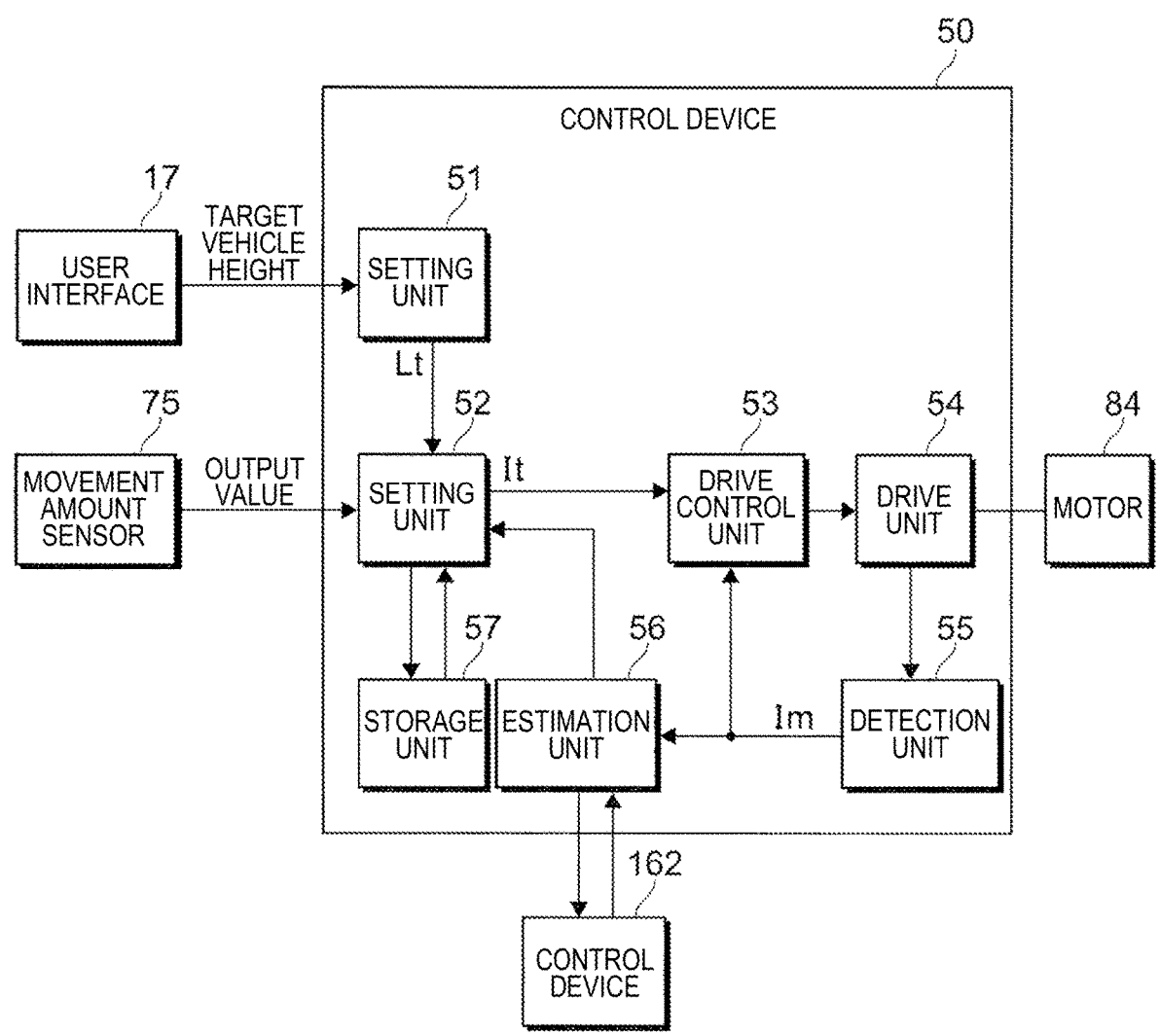
FIG. 4 is a diagram illustrating an example of a block diagram of a control device 50.

FIG. 4 is a diagram illustrating an example of a block diagram of the control device 50.

The control device 50 includes a CPU, a ROM in which a program executed by the CPU, various data, and the like are stored, a RAM used as a working memory or the like of the CPU, and an EEPROM which is a nonvolatile memory. Operation information of the user interface 17, output information of the movement amount sensor 75, and the like are input to the control device 50. The control device 50 operates by being supplied with electric power (that is, energized) from the battery during the driving. The control device 50 mutually transmits data to the control device 152, the control device 162, and the GPS 180 via the vehicle network 190.

The control device 50 includes a setting unit 51 that sets a target movement amount Lt of the support member 73 of the jack unit 71, a setting unit 52 that sets a target current It to be supplied to the motor 84, and a drive control unit 53 that controls driving of the motor 84. In addition, the control device 50 also includes a drive unit 54 that drives the motor 84, and a detection unit 55 that detects a motor current Im that actually flows through the motor 84. In addition, the control device 50 includes an estimation unit 56 that estimates a temperature of the motor 84 using the motor current Im detected by the detection unit 55, and a storage unit 57 that stores the output value of the movement amount sensor 75 and the like. The setting unit 51, the setting unit 52, the drive control unit 53, and the estimation unit 56 are implemented by the CPU executing software stored in a storage area such as a ROM. The storage unit 57 is implemented by a RAM or an EEPROM.

The drive control unit 53 performs a feedback control so that a deviation between the target current It set by the setting unit 52 and the motor current Im detected by the detection unit 55 becomes zero.

The drive unit 54 includes, for example, a transistor (FET) as a switching element connected between a positive electrode side line of a power supply and a coil of the motor 84. Further, the drive unit 54 drives a gate of the transistor to cause the transistor to perform a switching operation, thereby controlling the driving of the motor 84.

The detection unit 55 detects the motor current Im flowing through the motor 84 from a voltage generated between both ends of a shunt resistor connected to the drive unit 54.

The setting unit 51 sets the target movement amount Lt to a value corresponding to a control mode selected by the user via the user interface 17. For example, the control modes corresponding to target vehicle heights of three levels of high, medium, and low are selectably displayed on the user interface 17. In the ROM, target movement amounts Lt corresponding to the respective target vehicle heights of high, medium, and low are determined and stored in advance. Hereinafter, the target movement amount Lt corresponding to a highest target vehicle height of "high" among the target vehicle heights of the high, medium, and low may be referred to as a maximum target value Lth, and the target movement amount Lt corresponding to a lowest target vehicle height of "low" may be referred to as a minimum target value Ltl. In addition, the target movement amount Lt corresponding to an intermediate target vehicle height of "medium" among the target vehicle heights of the high, medium, and low may be referred to as an intermediate target value Ltm.

When the control mode corresponding to the target vehicle height of "high" is selected via the user interface 17, the setting unit 51 sets the target movement amount Lt to the maximum target value Lth. When the control mode corresponding to the target vehicle height of "medium" is selected via the user interface 17, the setting unit 51 sets the target movement amount Lt to the intermediate target value Ltm. When the control mode corresponding to the target vehicle height of "low" is selected via the user interface 17, the setting unit 51 sets the target movement amount Lt to the minimum target value Ltl.

The setting unit 52 sets the target current It for moving the piston 82 so that the target movement amount Lt set by the setting unit 51 and a current movement amount La grasped using the output value of the movement amount sensor 75 coincide with each other.

However, when the temperature of the motor 84 estimated by the estimation unit 56 becomes equal to or higher than a predetermined allowable temperature, the setting unit 52 sets the target current It to 0 in order to stop the driving of the motor 84. The allowable temperature may be, for example, a temperature set to a value lower than a temperature that may lead to breakage such as melting of solder due to heat generation of the motor 84.

When the piston 82 is moved in a direction in which the oil is discharged from the storage chamber 83, the setting unit 52 sets the target current It to a first value determined in advance in order to increase the vehicle height. On the other hand, when the piston 82 is moved in a direction in which the oil is discharged from the jack chamber 72, the setting unit 52 sets the target current It to a second value determined in advance in order to decrease the vehicle height. When the current in the direction in which the motor 84 is rotated so as to move the piston 82 in order to discharge the oil from the storage chamber 83 is positive and the current in the direction in which the motor 84 is rotated so as to move the piston 82 in order to discharge the oil from the jack chamber 72 is negative, the first value may be 8 A and the second value may be −8 A.

When determining a movement direction of the piston 82, the setting unit 52 first determines whether a subtraction value ΔL (=Lt−La) obtained by subtracting the current movement amount La calculated as described later from the target movement amount Lt is within a predetermined range. When the subtraction value ΔL is within the predetermined range, the setting unit 52 sets the target current It to 0. Note that the predetermined range may be, for example, −0.2 (mm) or more and 0.2 (mm) or less. In addition, when the subtraction value ΔL is larger than the maximum value in the predetermined range (for example, ΔL>0.2 (mm)), the setting unit 52 sets the target current It to the first value so as to move the piston 82 in the direction in which the oil is discharged from the storage chamber 83. On the other hand, when the subtraction value ΔL is smaller than the minimum value in the predetermined range (for example, ΔL<−0.2 (mm)), the setting unit 52 sets the target current It to the second value so as to move the piston 82 in the direction in which the oil is discharged from the jack chamber 72.

Hereinafter, a time when the support member 73 is moved due to the setting unit 51 changing the setting of the target movement amount Lt may be referred to as "during an operation". In addition, a period from when the subtraction value ΔL is within the predetermined range during the operation and the setting unit 52 sets the target current It to 0 to when the setting unit 51 changes the setting of the target movement amount Lt next may be referred to as "during stop".

Figure 5:
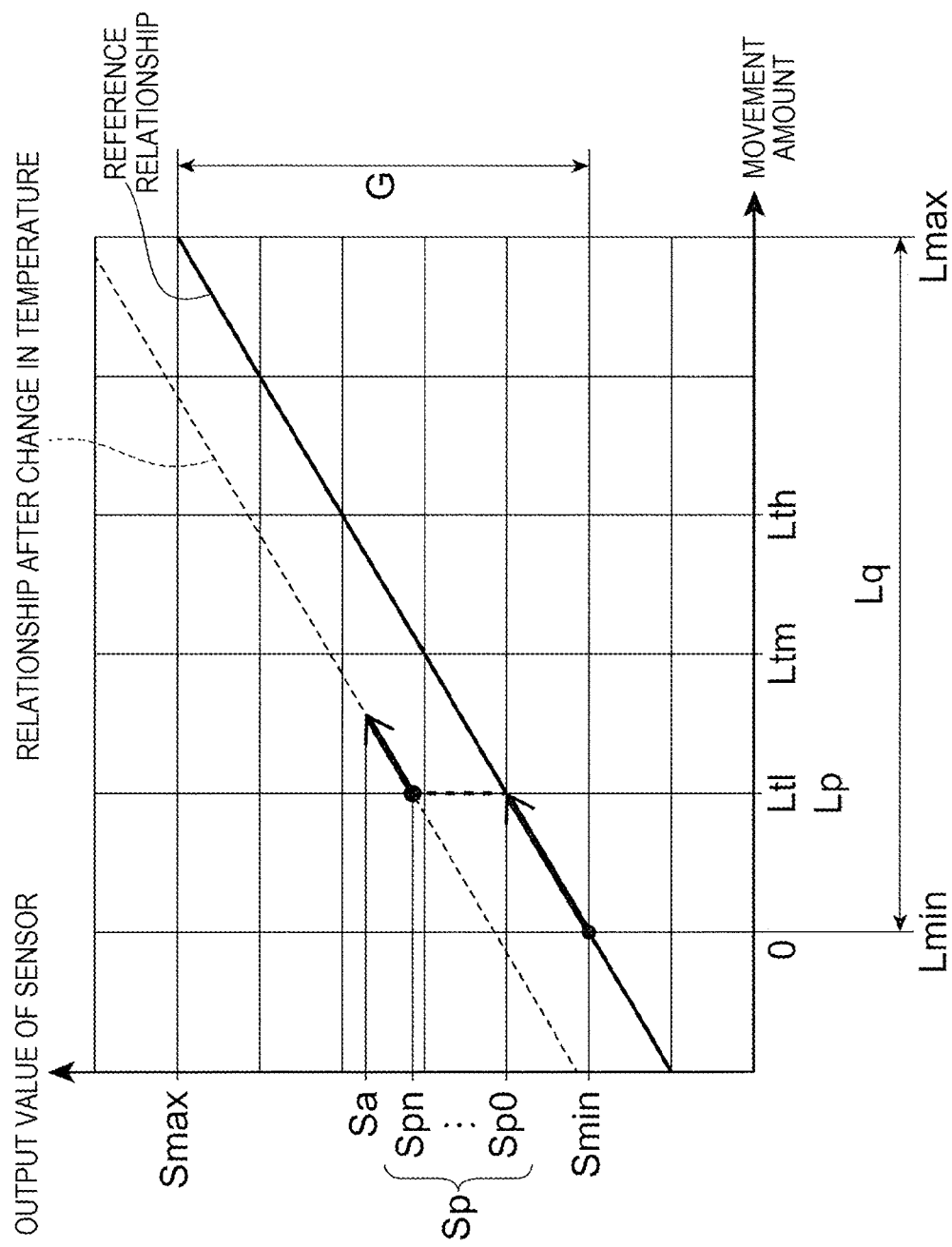
FIG. 5 is a diagram illustrating an example of a relationship between a movement amount of a support member 73 and an output value of a movement amount sensor 75.

FIG. 5 is a diagram illustrating an example of a relationship between the movement amount of the support member 73 and the output value of the movement amount sensor 75.

During the operation, the setting unit 52 calculates the current movement amount La using the following formula (1).

$$La = Lp + (Sa - Sp) \times Lq/G \quad (1)$$

Here, Lp, Sa, Sp, Lq, and G can be exemplified as the following values, respectively.

Lp is a movement amount at a position at which the support member 73 stops when the setting unit 51 changes the target movement amount Lt. That is, Lp is the target movement amount Lt during previous stop. For example, when the target vehicle height of "low" is selected and the movement amount of the support member 73 is the minimum target value Ltl, Lp is the minimum target value Ltl in a case where the target vehicle height is changed to "medium" via the user interface 17.

Sa is the current output value of the movement amount sensor 75.

Sp is an output value of the movement amount sensor 75 at a position at which the support member 73 stops when the setting unit 51 changes the target movement amount Lt. As will be described later, Sp is a value stored in the storage unit 57.

Lq is a movement amount by which the support member 73 is movable. In other words, Lq is a difference between the minimum movement amount Lmin, which is a movement amount when the support member 73 is positioned at the reference position, and the maximum movement amount Lmax at the position where the support member 73 is moved to the maximum. In the present embodiment, since the minimum movement amount Lmin is 0, Lq=Lmax.

G is a difference between a minimum output value Smin, which is an output value of the movement amount sensor 75 when the support member 73 is positioned at the reference position, in other words, at the minimum movement amount Lmin, and the maximum output value Smax, which is the output value of the movement amount sensor 75 at the maximum movement amount Lmax.

Lq and G are predetermined and stored in the ROM. In addition, the ROM also stores a reference relationship between the movement amount of the support member 73 and the output value of the movement amount sensor 75, which is a linear relationship connecting the minimum output value Smin at the minimum movement amount Lmin and the maximum output value Smax at the maximum movement amount Lmax. The reference relationship is determined using a value measured when the movement amount sensor 75 is at a room temperature.

The setting unit 52 periodically acquires the output value of the movement amount sensor 75 and stores the acquired output value in the storage unit 57 during the stop. The output value stored in the storage unit 57 in this manner is Sp. FIG. 5 also illustrates an example in which the relationship between the movement amount of the support member 73 and the output value of the movement amount sensor 75 changes due to a change in the temperature of the movement amount sensor 75. In the example illustrated in FIG. 5, the output value of the movement amount sensor 75 is large due to the change in the temperature even if the movement amount of the support member 73 is the same. In addition, FIG. 5 illustrates a case where the output value of the movement amount sensor 75 at the time of stopping due to the subtraction value ΔL being within the predetermined range is Sp0, and thereafter, the output value of the movement amount sensor 75 when the movement of the support member 73 is started due to the setting change of the target movement amount Lt by the setting unit 51 is Spn. In the case of the example illustrated in FIG. 5, the setting unit 52 updates the output value Sp of the movement amount sensor 75 during the stop from Sp0 to Spn.

Figure 6:
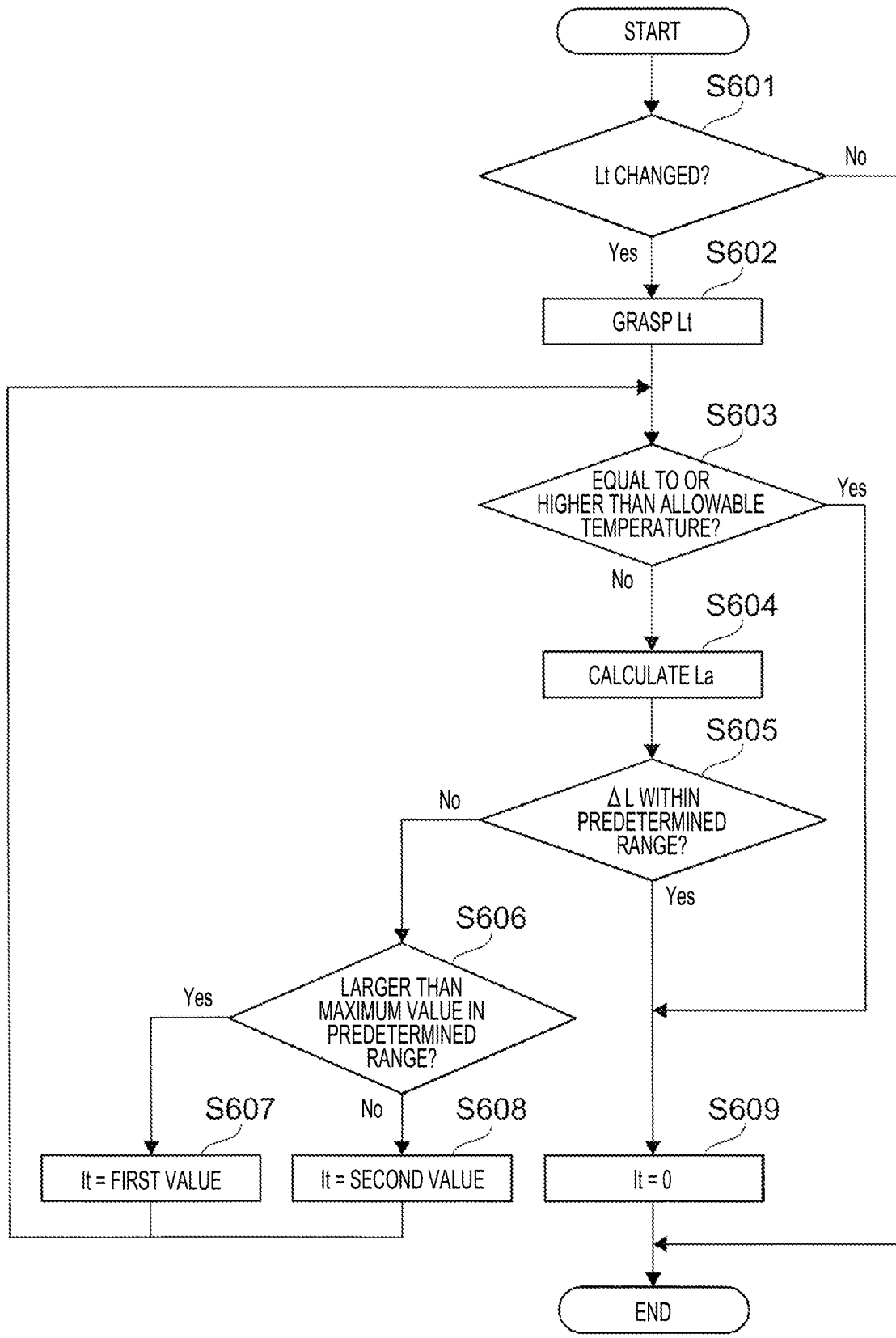
FIG. 6 is a flowchart illustrating an example of a procedure of a process of setting a target current It performed by a setting unit 52.

FIG. 6 is a flowchart illustrating an example of a procedure of a process of setting the target current It performed by the setting unit 52.

The setting unit 52 repeatedly executes this process, for example, in a predetermined control cycle (for example, every one millisecond).

The setting unit 52 first determines whether the target movement amount Lt is changed by the setting unit 51 (S601). When the target movement amount Lt is changed (Yes in S601), the setting unit 52 grasps the changed target movement amount Lt (S602). Thereafter, the setting unit 52 determines whether the temperature of the motor 84 estimated by the estimation unit 56 is equal to or higher than the allowable temperature (S603). When the temperature of the motor 84 is not equal to or higher than the allowable temperature (No in S603), the setting unit 52 calculates the current movement amount La using the above formula (1) (S604). Thereafter, the setting unit 52 determines whether the subtraction value ΔL(=Lt−La) obtained by subtracting the current movement amount La calculated in S604 from the target movement amount Lt grasped in S602 is within the predetermined range (S605). When the subtraction value ΔL is not within the predetermined range (No in S605), the setting unit 52 determines whether the subtraction value ΔL is larger than the maximum value in the predetermined range (S606). Further, when the subtraction value ΔL is larger than the maximum value (Yes in S606), the setting unit 52 sets the target current It to the first value in order to move the piston 82 in the direction in which the oil is discharged from the storage chamber 83 (S607). Thereafter, the setting unit 52 performs the processing of S603 and the subsequent steps.

On the other hand, when the subtraction value ΔL is not larger than the maximum value (No in S606), since it is considered that the subtraction value ΔL is smaller than the minimum value in the predetermined range, the setting unit 52 sets the target current It to the second value in order to move the piston 82 in the direction in which the oil is discharged from the jack chamber 72 (S608). Thereafter, the setting unit 52 performs the processing of S603 and the subsequent steps.

On the other hand, when the subtraction value ΔL is within the predetermined range (Yes in S605), the setting unit 52 sets the target current It to 0 (S609). In addition, when the temperature of the motor 84 is equal to or higher than the allowable temperature (Yes in S603), the setting unit 52 sets the target current It to 0 (S609). Thereafter, the setting unit 52 ends the process.

When the target movement amount Lt is not changed (No in S601), the setting unit 52 ends the process.

(Estimation Unit 56)

Figure 7:
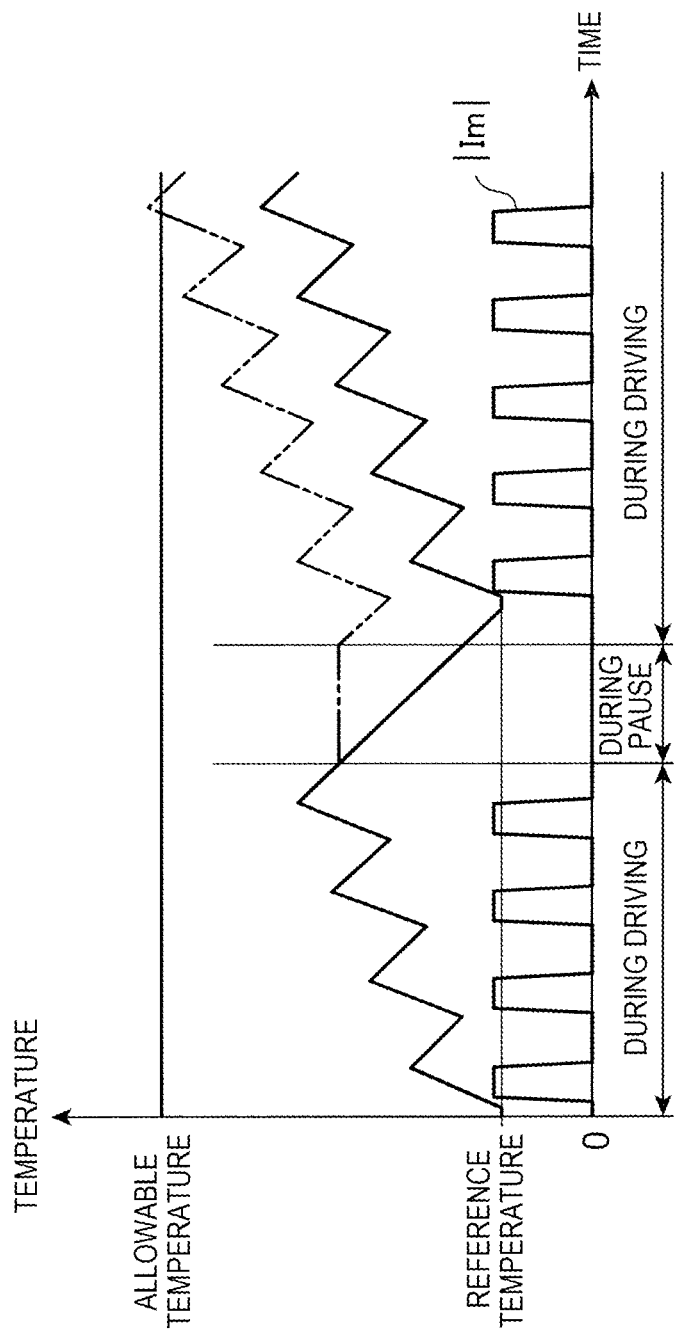
FIG. 7 is a diagram illustrating an example of a change in a temperature of a motor 84 estimated by an estimation unit 56.

FIG. 7 is a diagram illustrating an example of a change in the temperature of the motor 84 estimated by the estimation unit 56.

The estimation unit 56 estimates the temperature of the motor 84 using the motor current Im detected by the detection unit 55. As indicated by a solid line in FIG. 7, when a current is supplied to the motor 84 (the motor 84 is energized), the estimation unit 56 estimates the temperature of the motor 84 such that the temperature of the motor 84 increases as an integral value obtained by time-integrating an absolute value of the motor current Im that changes with time increases. On the other hand, when no current is supplied to the motor 84 (when the motor 84 is not energized), since heat is dissipated, the estimation unit 56 estimates the temperature of the motor 84 so that the temperature of the motor 84 decreases as the integral value obtained by time-integrating a predetermined negative coefficient decreases. However, the estimation unit 56 estimates that the temperature of the motor 84 is a reference temperature when the temperature estimated to decrease as the integral value decreases is equal to or lower than the reference temperature predetermined as a room temperature.

When the control device 50 is supplied with electric power during the driving, the estimation unit 56 can grasp the time when the current is supplied to the motor 84 and the time when no current is supplied to the motor 84, and thus can estimate the temperature of the motor 84 with high accuracy. However, since the control device 50 is not supplied with electric power and the estimation unit 56 cannot acquire the time information by itself during the pause, the estimation unit 56 cannot grasp the time (pause time) when no current is supplied to the motor 84. As a result, since the estimation unit 56 cannot acquire a heat dissipation time from the motor 84 by itself, the estimation unit 56 cannot estimate the temperature of the motor 84 with high accuracy. For example, as indicated by a two-dot chain line in FIG. 7, when the motorcycle 1 is restarted after the pause, it is considered that the estimation unit 56 estimates the temperature thereafter using an estimated temperature immediately before the pause as an estimated temperature at a current time point. However, in such a case, since an amount of heat dissipation during the pause is not taken into consideration, there is a possibility that the temperature of the motor 84 cannot be estimated with high accuracy.

Therefore, when the ignition switch is turned off, the estimation unit 56 instructs the control device 162 of the anti-theft system 160 to calculate the elapsed time from when the ignition switch is turned off to when the ignition switch is turned on again and the motorcycle 1 is started. The control device 162 that receives this instruction starts to calculate the elapsed time with the timer 163. The estimation unit 56 is set such that, when the ignition switch is turned off, the power supply from the battery is stopped after a time required for transmitting the calculation instruction of the elapsed time to the control device 162 has elapsed.

Then, when the motorcycle 1 is started again and the control device 50 is supplied with electric power, the estimation unit 56 receives the elapsed time calculated by the timer 163 from the control device 162 of the anti-theft system 160, thereby grasping the elapsed time (pause time). Thereafter, the estimation unit 56 estimates the temperature of the motor 84 using the elapsed time (pause time) received from the control device 162 as the time when no current is supplied to the motor 84 and the heat is dissipated.

In the motorcycle 1 configured as described above, the setting unit 52 stores the output value of the movement amount sensor 75 during the stop in the storage unit 57. Further, after the movement of the support member 73 is started due to the setting change of the target movement amount Lt by the setting unit 51, the movement amount from the position of the support member 73 during the stop (the previous target movement amount Lt) is calculated using the latest output value of the movement amount sensor 75 during the stop stored in the storage unit 57. Therefore, even if the output value of the movement amount sensor 75 changes due to the change in the temperature during the stop, the setting unit 52 can calculate the current position of the support member 73 with high accuracy using the changed output value. As a result, the setting unit 52 can set the target current It so that the movement amount of the support member 73 accurately matches the target movement amount Lt even when the change in the temperature occurs. As a result, the control device 50 can adjust the vehicle height to a desired height with high accuracy.

The control system 120 includes the control device 50 that is energized during the driving to control the operation of the motor 84 as an example of a movable unit and is de-energized during the pause, and the anti-theft system 160 as an example of a system that is communicable with the control device 50 and can be energized during the pause to grasp information on a time. Further, when the vehicle is restarted after the pause, the control device 50 grasps the elapsed time (pause time), which is a time elapsed during the pause, using the information received from the anti-theft system 160, and controls the motor 84 using the elapsed time. For example, during the driving, the control device 50 estimates the temperature of the motor 84 in consideration of an amount of heat generated by the motor 84 using an amount of current supplied to the motor 84 and the time during which the current is supplied. On the other hand, when the vehicle is restarted after the pause, the control device 50 estimates the temperature of the motor 84 in consideration of the amount of heat dissipation the motor 84 using the elapsed time. Then, when the estimated temperature becomes equal to or higher than the allowable temperature, the control device 50 sets the target current It to 0 in order to stop the driving of the motor 84. Thus, the motor 84 can be prevented from being damaged by heat. That is, even when the control device 50 does not have a function of acquiring the time information during the pause, the control device 50 can accurately estimate the temperature of the motor 84 by receiving the elapsed time during the pause from another system at the time of restart, so that it is possible to appropriately control the motor 84 so as not to be damaged.

Second Embodiment

Figure 8:
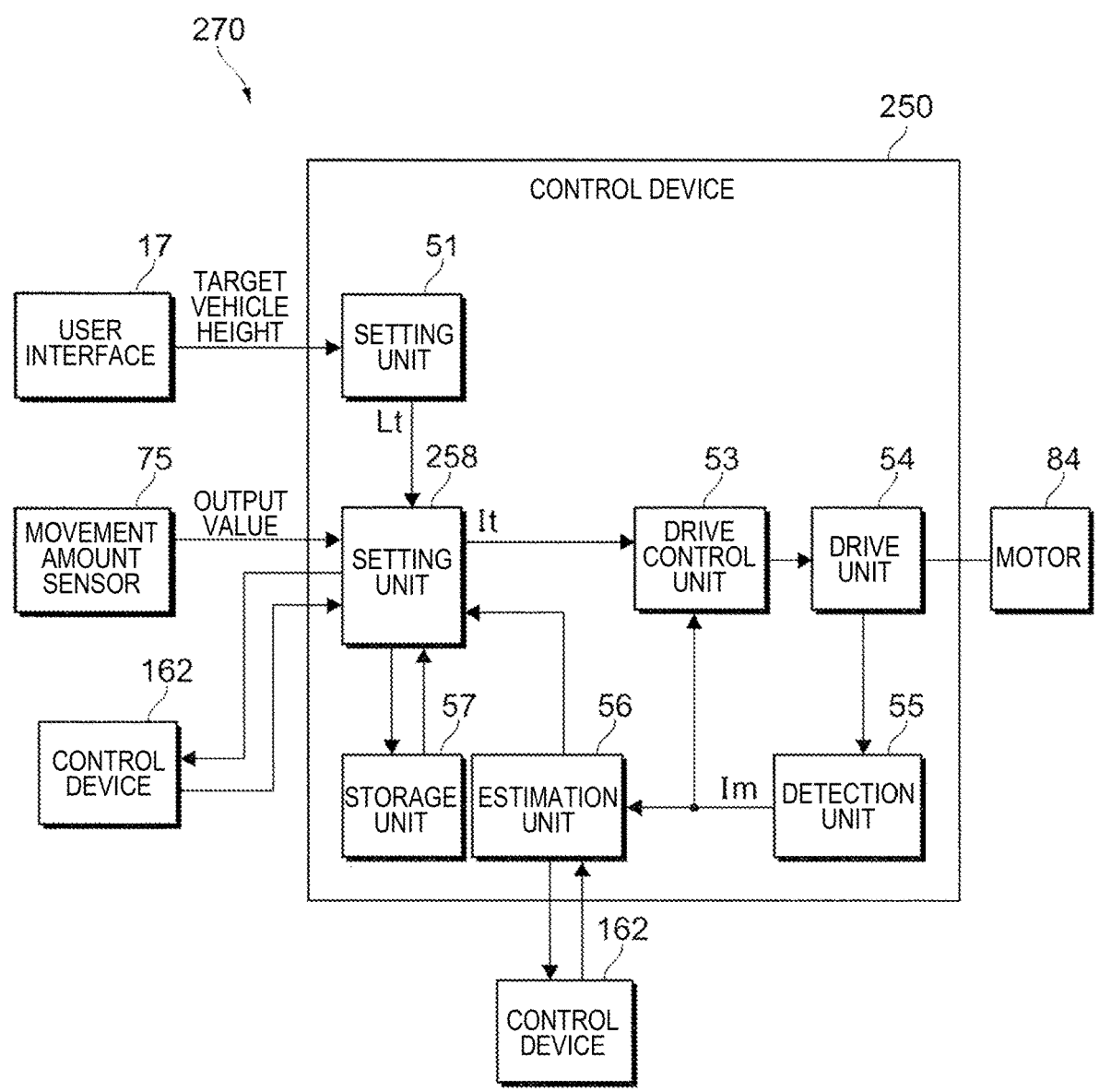
FIG. 8 is a diagram illustrating an example of a block diagram of a control device 250 of a suspension system 270 according to a second embodiment.

FIG. 8 is a diagram illustrating an example of a block diagram of a control device 250 provided in a suspension system 270 according to a second embodiment.

The suspension system 270 according to the second embodiment is different from the suspension system 170 according to the first embodiment in the control device 250 corresponding to the control device 50. The control device 250 is different from the control device 50 in a setting unit 258 corresponding to the setting unit 52. Hereinafter, differences from the first embodiment will be described. In the first embodiment and the second embodiment, constituent elements having the same functions are denoted by the same reference numerals, and detailed description thereof will be omitted.

When it can be determined that the movement amount sensor 75 is at a room temperature immediately after the motorcycle 1 is started, the setting unit 258 calculates the current movement amount La using the following formula (2). On the other hand, when it cannot be determined that the movement amount sensor 75 is at a room temperature immediately after the motorcycle 1 is started, the setting unit 258 calculates the current movement amount La using the above formula (1).

$$La = (Sa - Smin) \times Lq/G \quad (2)$$

Here, Smin is an output value of the movement amount sensor 75 when the support member 73 is positioned at the reference position (at the minimum movement amount Lmin). Smin is determined in advance and stored in the ROM.

The setting unit 258 grasps the elapsed time from when the start of the motorcycle 1 is stopped to when the motorcycle 1 is restarted, and determines that the movement amount sensor 75 is at a room temperature when the elapsed time is equal to or longer than a predetermined time. Similarly to the estimation unit 56 according to the first embodiment, the setting unit 258 receives the elapsed time calculated by the timer 163 from the control device 162 of the anti-theft system 160, thereby grasping the elapsed time (pause time).

Here, since the movement of the support member 73 is stopped by the setting unit 52 setting the target current It to 0 when the subtraction value ΔL is within the predetermined range during the operation, the actual movement amount at a stop position of the support member 73 may be different from the target movement amount Lt. Further, in a different case, the setting unit 52 erroneously recognizes the movement amount of the support member 73 as a movement amount different from the actual movement amount even during the stop.

However, when the elapsed time from when the start of the motorcycle 1 is stopped to when the motorcycle 1 is restarted is equal to or longer than the predetermined time, the setting unit 258 calculates the current movement amount La using the difference between the output value Sa of the sensor at the current position and the output value Smin of the sensor at the reference position immediately after the start of the motorcycle 1. Accordingly, it is possible to prevent the support member 73 from being unable to be stopped at a desired position due to the setting unit 258 setting the target current It while erroneously recognizing the movement amount of the support member 73.

Even when the control device 250 does not have a function of acquiring the time information during the pause, the control device 250 can accurately determine that the movement amount sensor 75 is at a room temperature by receiving the elapsed time during the pause from another system at the time of restart. As a result, the control device 250 can accurately adjust the movement amount of the support member 73 to the target movement amount Lt, and therefore can control the vehicle height to a desired height.

Third Embodiment

A suspension system 370 according to a third embodiment is different from the suspension system 170 according to the first embodiment in a control device 350 corresponding to the control device 50. Hereinafter, differences from the first embodiment will be described. In the first embodiment and the third embodiment, constituent elements having the same functions are denoted by the same reference numerals, and detailed description thereof will be omitted.

In addition to the functions of the control device 50, the control device 350 has a function of controlling the damping force of the damping device 200 in consideration of the elapsed time during the pause.

Figure 9:
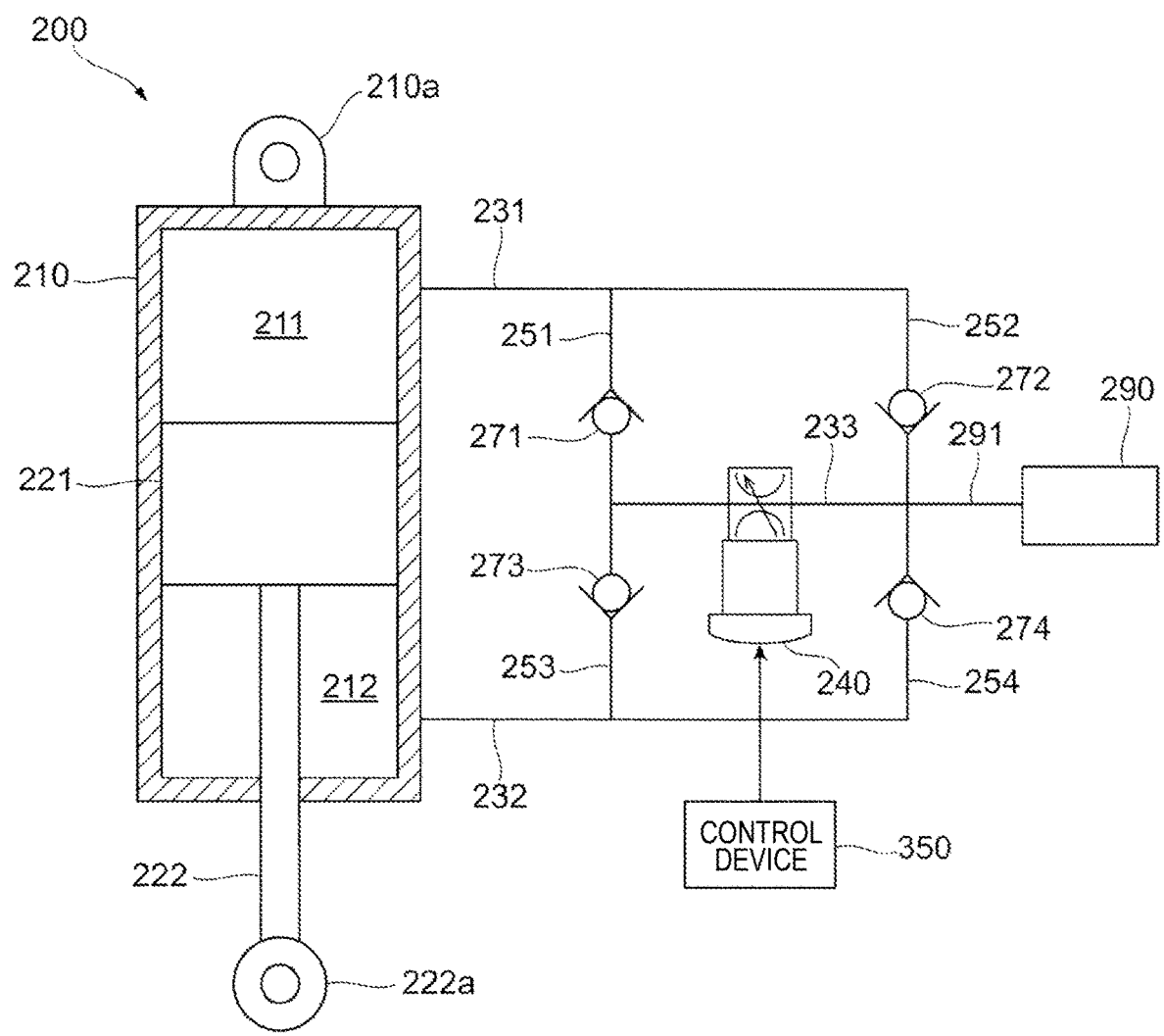
FIG. 9 is a diagram illustrating an example of a schematic configuration of a damping device 200.

FIG. 9 is a diagram illustrating an example of a schematic configuration of the damping device 200.

The damping device 200 is the same as the damping device disclosed in Japanese Patent Application Publication No. 2019-77198 filed by the present applicant. Members and portions having the same shape and function are denoted by the same reference numerals, and detailed description thereof will be omitted.

The damping device 200 includes a cylinder 210, a piston 221, and a piston rod 222. An end portion 210a of the cylinder 210 is connected to the vehicle main body 10. The piston rod 222 holds the piston 221 at an end portion on an end portion 210a side, and an end portion 222a on an opposite side to the end portion 210a is connected to the vehicle wheel.

The inside of the cylinder 210 is partitioned into an oil chamber 211 and an oil chamber 212 by the piston 221.

The damping device 200 includes a first oil passage 231, a second oil passage 232, a third oil passage 233, and a damping force control valve 240. The damping device 200 includes a first branch path 251, a second branch path 252, a third branch path 253, and a fourth branch path 254.

The damping device 200 includes a first check valve 271, a second check valve 272, a third check valve 273, and a fourth check valve 274. In addition, the damping device 200 includes a reservoir 290 and a reservoir passage 291.

The damping force control valve 240 is an electromagnetic valve having a solenoid, and increases a pressure of hydraulic oil passing through the valve as an amount of current supplied to the solenoid increases. In other words, the damping force control valve 240 is an electromagnetic valve that changes an area of a flow path of oil, decreases the area of the flow path as the amount of current supplied to the solenoid increases, and increases the area of the flow path as the amount of current supplied to the solenoid decreases. The amount of current supplied to the solenoid is controlled by the control device 350.

Figure 10:
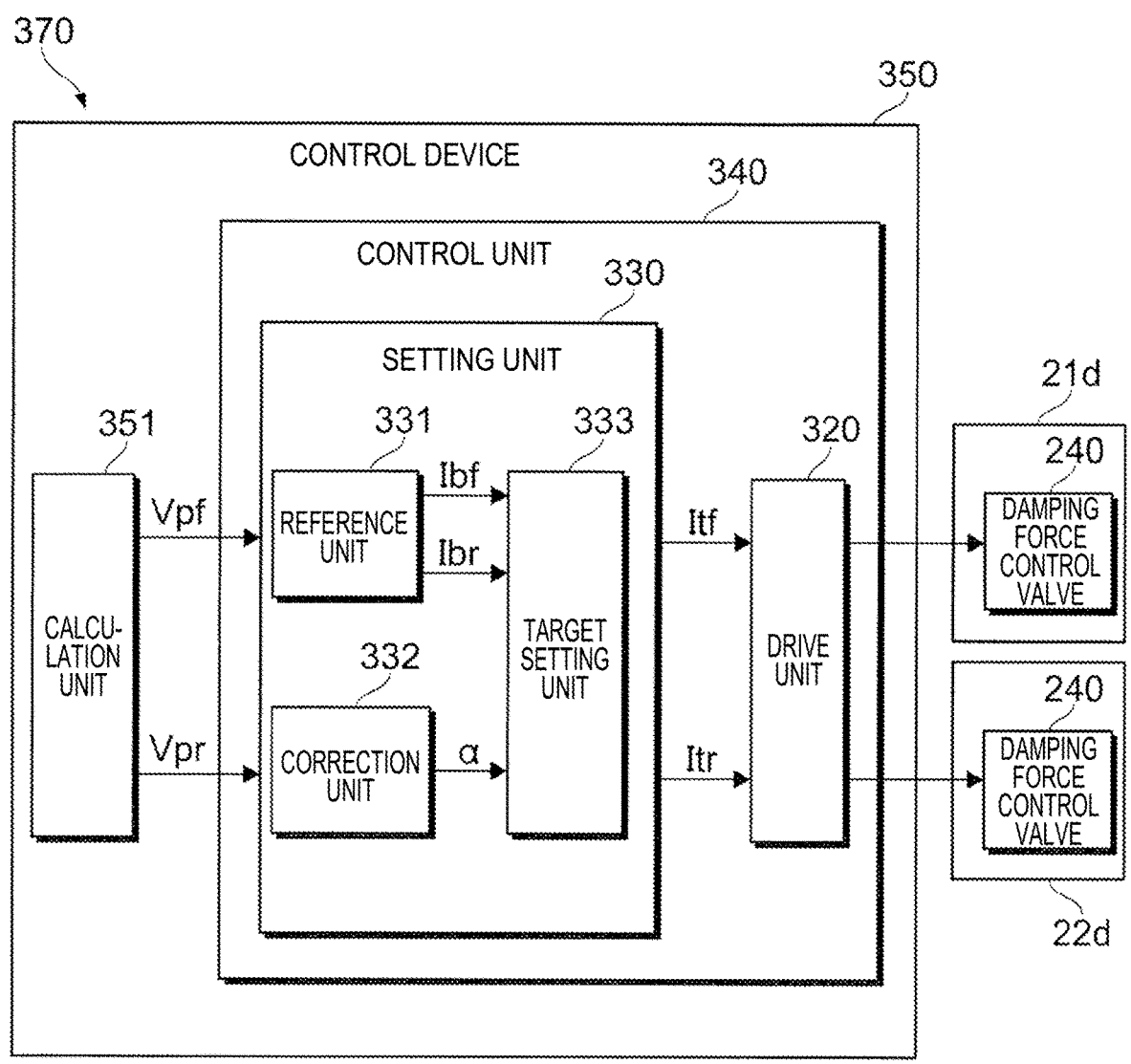
FIG. 10 is a diagram illustrating an example of a block diagram of a control device 350 of a suspension system 370 according to a third embodiment.

FIG. 10 is a diagram illustrating an example of a block diagram of the control device 350 provided in the suspension system 370 according to the third embodiment.

The control device 350 includes a calculation unit 351 that calculates a velocity of change in a stroke amount of the suspension 23. The calculation unit 351 calculates a velocity Vpf, which is a velocity of a change in a stroke amount of the suspension 21, using an output signal from a stroke sensor that detects the stroke amount of the suspension 21. In addition, the calculation unit 351 calculates a velocity Vpr, which is a velocity of a change in a stroke amount of the suspension 22, using an output signal from a stroke sensor that detects the stroke amount of the suspension 22. In the following description, the velocity Vpf and the velocity Vpr may be collectively referred to as a "velocity Vp".

The control device 350 includes a control unit 340 that controls the damping forces of the damping devices 21d, 22d using the velocities Vpf, Vpr calculated by the calculation unit 351.

The control unit 340 controls the damping force by controlling the amount of current supplied to the solenoid of the damping force control valve 240. Specifically, the control unit 340 increases the amount of current supplied to the solenoid of the damping force control valve 240 when the damping force is increased, and decreases the amount of current supplied to the solenoid of the damping force control valve 240 when the damping force is decreased.

The control unit 340 includes a setting unit 330 that sets the target currents Itf, Itr to be supplied to the solenoid of the damping force control valve 240, and a drive unit 320 that drives the damping force control valve 240.

The setting unit 330 sets the target current Itf on a front wheel side to be supplied to the solenoid of the damping force control valve 240 of the damping device 21d based on the velocity Vpf and the like calculated by the calculation unit 351. In addition, the setting unit 330 sets the target current Itr on a rear wheel side to be supplied to the solenoid of the damping force control valve 240 of the damping device 22d based on the velocity Vpr and the like calculated by the calculation unit 351.

The setting unit 330 includes a reference unit 331 that sets reference currents Ibf, Ibr serving as references for setting the target currents Itf, Itr. The setting unit 330 includes a correction unit 332 that sets a correction coefficient α for correcting the reference currents Ibf, Ibr according to the temperature. In addition, the setting unit 330 includes a target setting unit 333 that sets the target currents Itf, Itr using the reference currents Ibf, Ibr set by the reference unit 331 and the correction coefficient α set by the correction unit 332.

The reference unit 331 calculates a reference current Ibf corresponding to the velocity Vpf. The reference unit 331 calculates the reference current Ibf by substituting the velocity Vpf into a control map indicating a relationship between the reference current Ibf and the velocity Vpf, which is created in advance based on an empirical rule and recorded in the ROM, for example.

In addition, the reference unit 331 calculates the reference current Ibr corresponding to the velocity Vpr. The reference unit 331 calculates the reference current Ibr by substituting the velocity Vpr into a control map indicating a relationship between the reference current Ibr and the velocity Vpr, which is created in advance based on an empirical rule and recorded in the ROM, for example.

Immediately after the start, the correction unit 332 first receives the elapsed time calculated by the timer 163 from the control device 162 of the anti-theft system 160 to grasp the elapsed time (pause time), similarly to the estimation unit 56 according to the first embodiment. Further, when the grasped elapsed time is less than a predetermined reference time, the correction unit 332 sets the correction coefficient α to one, and when the grasped elapsed time is equal to or longer than the reference time, the correction unit 332 sets the correction coefficient α to a predetermined value that is value smaller than one.

The target setting unit 333 sets, as the target currents Itf, Itr, values obtained by multiplying the reference currents Ibf, Ibr set by the reference unit 331 by the correction coefficient α set by the correction unit 332, respectively.

The drive unit 320 includes, for example, a transistor (FET) as a switching element connected between a positive electrode side line of a power supply and a coil of a solenoid of the damping force control valve 240. Further, the drive unit 320 controls the driving of the damping force control valve 240 by driving a gate of the transistor to cause the transistor to perform a switching operation. More specifically, the drive unit 320 causes the transistor to perform the switching operation such that the current supplied to the damping force control valve 240 becomes the target currents Itf, Itr set by the setting unit 330.

In the motorcycle 1 configured as described above, when the grasped elapsed time is equal to or longer than the reference time, the correction coefficient α is set to a value smaller than one, so that even if the velocity Vp is the same, the target current It is smaller than when the elapsed time is less than the reference time. As a result, when the grasped elapsed time is equal to or longer than the reference time, the amount of current supplied to the solenoid of the damping force control valve 240 becomes smaller than when the elapsed time is less than the reference time, and therefore the area of the flow path becomes larger. As a result, even if the pause time is long and a temperature of the oil in the suspension 23 is low and the suspension 23 becomes hard, the oil easily flows, so that a desired damping force is easily obtained regardless of the temperature of the oil. As described above, even when the control device 350 does not have a function of acquiring the time information during the pause, the control device 350 can grasp that the temperature of the oil is low by receiving the elapsed time during the pause from another system at the time of restart. As a result, it is possible to appropriately perform a control so as to obtain a desired damping force.

The function of the control device 350 for controlling the damping force of the damping device 200 in consideration of the elapsed time during the pause may be applied to the control device 250 according to the second embodiment.

Although the control devices 50, 250, and 350 described above receive the elapsed time during the pause from the control device 162 of the anti-theft system 160, the reception of the time information is not limited to a mode in which the time information is transmitted from the anti-theft system 160. The time information may be received from a control device of another system that operates by receiving power supply from the battery during the pause.

In addition, the control devices 50, 250, and 350 may grasp the elapsed time during the pause by receiving information on a time point (that is, information (second information) on time points before and after the pause of the vehicle) from the GPS 180 capable of acquiring the information on the time point (for example, at the time of GPS) transmitted from a GPS satellite via the vehicle network 190. For example, when the ignition switch is turned off, the control devices 50, 250, and 350 may receive the information on the time point from the GPS, and when the motorcycle 1 is started again and power is supplied to the control devices 50, 250, and 350, the control devices 50, 250, and 350 may receive the information on the time point from the GPS to grasp the elapsed time (pause time) during the pause.

What is claimed is:

1. A control system comprising:
a control device energized during driving of a vehicle to control an operation of a movable unit, and de-energized during a pause of the vehicle; and
a system communicable with the control device, and configured to grasp first information on time by being energized during the pause or to acquire second information on time points before and after the pause of the vehicle during the driving,
wherein the control device is configured to, when the vehicle is restarted after the pause, grasp an elapsed time, which is a time elapsed during the pause using at least one of the first information and the second information received from the system, and control the operation of the movable unit using the elapsed time, and
wherein the control device is configured to, control the operation of the movable unit using an output value of a sensor, and
wherein, when the vehicle is restarted after the pause, the control device is configured to control the operation of the movable unit using a difference between a current output value of the sensor and a reference output value in a case where the elapsed time is equal to or longer than a predetermined time, and control the operation of the movable unit using a difference between the current output value of the sensor and an output value before the pause in a case where the elapsed time is less than the predetermined time.

2. A control system comprising:
a control device energized during driving of a vehicle to control an operation of a movable unit, and de-energized during a pause of the vehicle; and
a system communicable with the control device, and configured to grasp first information on time by being energized during the pause or to acquire second information on time points before and after the pause of the vehicle during the driving,
wherein the control device is configured to, when the vehicle is restarted after the pause, grasp an elapsed time, which is a time elapsed during the pause using at least one of the first information and the second information received from the system, and control the operation of the movable unit using the elapsed time,
wherein the movable unit is an electromagnetic valve configured to change an area of a flow path of oil, and
wherein the control device is configured to, when the vehicle is restarted after the pause, control an operation of the electromagnetic valve such that the area of the flow path in a case where the elapsed time is equal to or longer than a predetermined time is larger than that in a case where the elapsed time is less than the predetermined time.

3. The control system according to claim 1,
wherein the system is an anti-theft system that is energized during the pause to authenticate a key of the vehicle and prevent theft of the vehicle.

4. The control system according to claim 1,
wherein the system is a GPS configured to acquire information on a time point transmitted from a GPS satellite.

5. A control system comprising:
a control device energized during driving of a vehicle to control an operation of a movable unit, and de-energized during a pause of the vehicle; and
a system communicable with the control device, and configured to grasp first information on time by being energized during the pause or to acquire second information on time points before and after the pause of the vehicle during the driving,
wherein the control device is configured to, when the vehicle is restarted after the pause, grasp an elapsed time, which is a time elapsed during the pause using at least one of the first information and the second information received from the system, and control the operation of the movable unit using the elapsed time, and
wherein the system is an anti-theft system that is energized during the pause to authenticate a key of the vehicle and prevent theft of the vehicle, or
the control device is configured to control the operation of the movable unit provided in a suspension disposed between the vehicle and a vehicle wheel.

6. The control system according to claim 5,
wherein the movable unit is a motor that is driven by being energized, and
wherein the control device is configured to estimate, during the driving, a temperature of the motor using an amount of current supplied to the motor and a time during which the current is supplied, estimate, when the vehicle is restarted after the pause, the temperature of the motor using the elapsed time, and control the motor in consideration of the estimated temperature.

7. The control system according to claim 1,
wherein the control device is configured to control the operation of the movable unit provided in a suspension disposed between the vehicle and a vehicle wheel.

8. The control system according to claim 5,
wherein the system is a GPS configured to acquire information on a time point transmitted from a GPS satellite.

9. The control system according to claim 2,
wherein the system is an anti-theft system that is energized during the pause to authenticate a key of the vehicle and prevent theft of the vehicle.

10. The control system according to claim 2,
wherein the system is a GPS configured to acquire information on a time point transmitted from a GPS satellite.

11. The control system according to claim 2,
wherein the control device is configured to control the operation of the movable unit provided in a suspension disposed between the vehicle and a vehicle wheel.

12. The control system according to claim 7,
wherein the control device is configured to control the operation of the movable unit provided in a suspension disposed between the vehicle and a vehicle wheel.

13. The control system according to claim 6,
wherein the system is a GPS configured to acquire information on a time point transmitted from a GPS satellite.

14. A straddle-type vehicle comprising:
a vehicle main body;
a vehicle wheel; and
the control system according to claim 1.

15. A straddle-type vehicle comprising:
a vehicle main body;
a vehicle wheel; and
a control system including: a control device energized during driving of a vehicle to control an operation of a movable unit and de-energized during a pause of the vehicle; and a system communicable with the control device, and configured to grasp first information on time by being energized during the pause or to acquire second information on time points before and after the pause of the vehicle during the driving, the control device being configured to, when the vehicle is restarted after the pause, grasp an elapsed time, which is a time elapsed during the pause, using at least one of the first information and the second information received from the system, and control the operation of the movable unit using the elapsed time.

16. The straddle-type vehicle according to claim 15,
wherein the movable unit is a motor that is driven by being energized, and
wherein the control device is configured to, estimate, during the driving, a temperature of the motor using an amount of current supplied to the motor and a time during which the current is supplied, estimate, when the vehicle is restarted after the pause, the temperature of the motor using the elapsed time, and control the motor in consideration of the estimated temperature.

17. The straddle-type vehicle according to claim 15,
wherein the system is a GPS configured to acquire information on a time point transmitted from a GPS satellite.

18. A straddle-type vehicle comprising:
a vehicle main body;
a vehicle wheel; and
the control system according to claim 2.

19. A straddle-type vehicle comprising:
a vehicle main body;
a vehicle wheel; and
the control system according to claim 7.

* * * * *